0
United States Patent Office 2,861,984
Patented Nov. 25, 1958

2,861,984

PRODUCTION OF AROMATIC FLUORIDES

Joseph Gordon and Cyril Woolf, Morristown, N. J., assignors to Allied Chemical & Dye Corporation, New York, N. Y., a corporation of New York No Drawing. Application January 28, 1957
Serial No. 636,504

5 Claims. (Cl. 260—141)

This invention relates to the production of 4-fluorocumene, and more particularly relates to an improved process for the production of 1-isopropyl-benzenediazonium fluoride which undergoes thermal decomposition to 4-fluorocumene.

It is well known that aromatic fluorides may be prepared by dissolving an aromatic amine or its hydrochloride in an excess of anhydrous hydrogen fluoride to form the corresponding hydrofluoride, treating the solution of hydrofluoride with a nitrite such as sodium nitrite to form a reaction mixture containing a diazonium compound and then heating the reaction mixture to produce the corresponding aromatic fluoride.

The object of the present invention is to provide an improved process for producing 1-isopropyl-benzenediazonium fluoride which may be thermally decomposed into 4-fluorocumene.

Other objects and advantages of the present invention will appear hereinafter.

In accordance with the present invention, 1-isopropylbenzenediazonium fluoride may be produced by dissolving a member of the group consisting of 4-cumidine and acid salts thereof (e. g., 4-cumidine hydrochloride and 4-cumidine acid sulfate) in an excess of liquid, anhydrous hydrogen fluoride, and treating the resulting solution with a nitrite (e. g., sodium nitrite) in the presence of at least about 0.5 mol, and preferably about 0.5 to 2.0 mols, of sulfuric acid equivalent per mol of 4-cumidine compound. The resulting reaction mixture containing 1-isopropyl-benzenediazonium fluoride may then be subjected to thermal decomposition to form the corresponding fluoride, 4-fluorocumene.

The reactions which are believed to proceed in the course of the process of the present invention, employing 4-cumidine hydrochloride and sodium nitrite as charge materials, may be illustrated by the following equations:

(1) 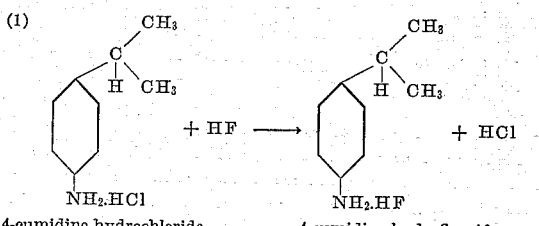

4-cumidine hydrochloride    4-cumidine hydrofluoride (2) 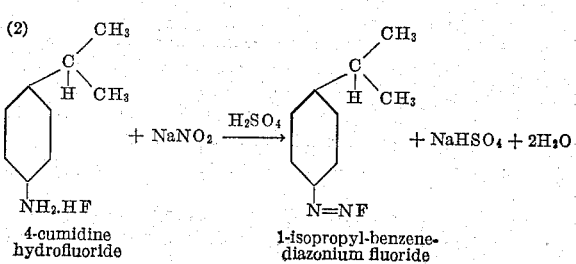

4-cumidine    1-isopropyl-benzene-
hydrofluoride    diazonium fluoride (3) 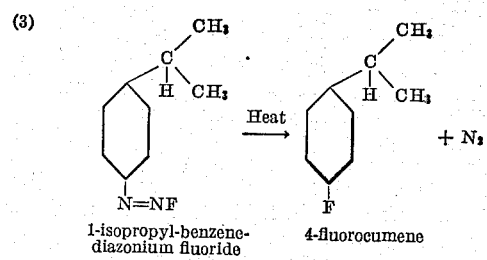

1-isopropyl-benzene-    4-fluorocumene
diazonium fluoride

The salient feature of the process of this invention involves carrying out the reaction with nitrite (diazotization reaction) in the presence of at least about 0.5 mol of sulfuric acid equivalent per mol of 4-cumidine charge material. Preferably, about 0.5 to 2.0 mols of sulfuric acid equivalent per mol of 4-cumidine charge material are employed. Although mol ratios greater than 2.0:1 may be used, they are not preferred from the standpoint of economy. The sulfuric acid equivalent is preferably supplied in the form of sulfuric acid itself. Since it is desirable that the operating conditions of the diazotization reaction be as anhydrous as possible, it is preferred to employ sulfuric acid in its concentrated form. However, if desired, 4-cumidine acid sulfate may be used as the charge material. In this case, all or most of the required sulfuric acid equivalent may be supplied by the starting material. Of course, if the starting material does not provide the required amount of sulfuric acid equivalent, additional sulfuric acid must then be added.

In typical operation of the process of the present invention, 4-cumidine or its hydrochloride is slowly added to anhydrous hydrogen fluoride contained in a cooled reactor at a temperature of about −10° to +15° C., thereby producing a solution of 4-cumidine hydrofluoride. About 10 to 25 mols of hydrogen fluoride per mol of 4-cumidine charge material are generally employed. Sulfuric acid, in ratio of at least about 0.5 mol per mol of 4-cumidine charge material is added to the solution. Then, maintaining the solution, while stirring, at a temperature of −10° to +10° C., a nitrite (such as sodium nitrite) is added in small increments, thereby effecting diazotization reaction. The total amount of nitrite added is generally about 1.0 to 2.0 mols per mol of 4-cumidine starting material. The resulting reaction mixture containing 1-isopropyl-benzenediazonium fluoride is then warmed to a temperature of at least about 30° C. until evolution of nitrogen ceases. The mixture is cooled, thereby forming an inorganic layer and an organic layer containing 4-fluorocumene. The organic layer is separated, neutralized with caustic and steam distilled. The distillate is finally dried and fractionally distilled to recover 4-fluorocumene.

The liquid, anhydrous hydrogen fluoride is employed in excess of the amount required by above Equation (1). About 10 to 25 mols, and preferably about 15 to 20 mols, of hydrogen fluoride per mol of 4-cumidine charge material are generally employed. The presence of the excess hydrogen fluoride during the diazotization and decomposition steps of the process has been found necessary for the obtainment of 4-fluorocumene in high yield. The hydrogen fluoride is maintained at a temperature of about −10° to +15° C., preferably about −10° to +5° C., during addition of the 4-cumidine starting material.

In effecting diazotization of the 4-cumidine starting material, a nitrite, preferably an alkali metal nitrite such as sodium nitrite, is generally employed in ratio of about 1.0 to 2.0 mols, and preferably about 1.0 to 1.2 mols, per mol of 4-cumidine charge material. The nitrite is preferably in dried form since it is desirable to have as little water as possible present during the reaction. The diazotization reaction is conducted at a temperature between about −10° to +10° C., and preferably about 0° to +5° C. Cooling may be accomplished by means of any suitable refrigerant, such as a circulating brine solution. The reaction is usually completed in about 2 to 4 hours, depending upon the particular rate of nitrite addition and efficiency of cooling employed.

Crude 4-fluorocumene product is obtained by thermally decomposing the reaction mixture containing 1-isopropyl-benzenediazonium fluoride at a temperature of at least about 30° C., preferably about 30° to 60° C., until the evolution of nitrogen ceases.

The crude 4-fluorocumene reaction product may be purified in any conventional manner. For example, the crude product is cooled to a temperature of about 15° to 20° C., thereby forming an inorganic layer and an organic layer containing the 4-fluorocumene. The organic layer is separated, neutralized with a suitable alkaline material such as caustic soda or caustic potash and then steam distilled. The distillate collected is dried, e. g., with sodium sulfate, and is fractionally distilled to produce the desired 4-fluorocumene (B. P. 152° to 155° C.).

4-fluorocumene finds use as an intermediate in the production of 4-fluorophenoxyacetic acid. The latter compound is a herbicide of high activity (see Journal of Agricultural and Food Chemistry, volume 2, page 996, September 15, 1954).

In the production of 4-fluorophenol, 4-fluorobenzene is oxidized to produce the corresponding hydroperoxide. The hydroperoxide is then decomposed by warming to form 4-fluorophenol. More specifically, 4-fluorocumene is oxidized with air at about 80° to 100° C. to form 1-α-hydroperoxy-4-fluorocumene. Unreacted 4-fluorocumene is recovered from the hydroperoxide product by vacuum distillation and is recycled. The hydroperoxide is then decomposed at a temperature of about 60° to 75° C. The crude reaction product is distilled to recover as separate fractions, by-product acetone which is useful as an organic solvent, and the desired 4-fluorophenol. This procedure for the production of 4-fluorophenol may be represented by the following equations:

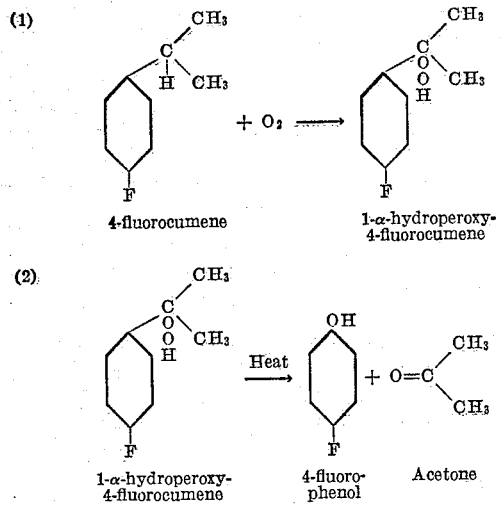

In the production of 4-fluorophenoxyacetic acid from 4-fluorophenol, any of the well-known procedures for converting halogenated phenols to their corresponding halophenoxyacetic acids may be employed. For example, the sodium salt of 4-fluorophenol may be condensed at 70° to 100° C. with sodium chloroacetate to produce sodium 4-fluorophenoxy acetate. The latter compound may then be acidified with a mineral acid such as hydrochloric acid to precipitate 4-fluorophenoxyacetic acid.

The following is an example of the preparation of 1-isopropyl-benzenediazonium fluoride and its decomposition into 4-fluorocumene. In the example, parts are by weight.

*Example 1.*—687 parts of 4-cumidine hydrochloride were added over a 30 minute period to 1240 parts of anhydrous hydrogen fluoride contained in an ice-cooled reactor at a temperature below 5° C. 400 parts of concentrated sulfuric acid (96%) were then added to the reactor. Maintaining a temperature of 0° to 5° C., 331 parts of dried sodium nitrite were added over a 3 hour period with agitation. After agitation for an additional ½ hour period, the reactor contents were heated to 40° to 50° C. and then to 55° C. until nitrogen evolution decreased to a very small rate. The reactor contents were then cooled to about 15° C., forming two layers, an inorganic and an organic layer. The organic layer was separated and was then poured into about 500 parts of a 20% potassium hydroxide solution. The neutralized material was steam distilled. The distillate was dried with sodium sulfate and fractionally distilled. 415 parts of the distillate came over at 152° to 155° C. at 755 mm. mercury absolute pressure. This fraction comprised 4-fluorocumene, its yield being about 75% of theory.

The following example describes the results obtained carrying out the reaction of Example 1 in the absence of sulfuric acid. Parts are by weight.

*Example 2.*—380 parts of 4-cumidine hydrochloride were added over a 30 minute period to 714 parts of anhydrous hydrogen fluoride contained in an ice-cooled reactor at a temperature below 5° C. 167 parts of dried sodium nitrite were added with stirring over a 1½ hour period at a temperature of 0° to 10° C. The reaction mixture was allowed to stand for one hour and was then heated to about 35° to 55° C. until no more nitrogen evolved. Upon cooling to about 20° C., the reactor contents formed an inorganic layer and an organic layer. The organic layer was separated, neutralized with 500 parts of a 20% sodium hydroxide solution and then steam distilled. The distillate was dried with sodium sulfate and fractionally distilled. 180 parts of the distillate came over at 152° to 155° C. at 755 mm. mercury absolute pressure. This fraction comprised 4-fluorocumene, its yield being about 62% of theory.

The above examples show that the presence of sulfuric acid during the diazotization reaction enabled the obtainment of over a 20% increase in yield of 4-fluorocumene.

Since various changes and modifications may be made in the invention without departing from the spirit thereof, the invention is deemed to be limited only by the scope of the appended claims.

We claim:

1. A process for making 1-isopropyl-benzene-4-diazonium fluoride which comprises dissolving a member of the group consisting of 4-cumidine and inorganic acid salts thereof in an excess of liquid, anhydrous hydrogen fluoride, and treating the resulting solution with an alkali metal nitrite in the presence of at least about 0.5 mol of sulfuric acid equivalent per mol of 4-cumidine compound.

2. A process for making 1-isopropyl-benzene-4-diazonium fluoride which comprises dissolving a member of the group consisting of 4-cumidine and inorganic acid salts thereof in an excess of liquid, anhydrous hydrogen fluoride, and treating the resulting solution with an alkali metal nitrite in the presence of about 0.5 to 2.0 mols of sulfuric acid equivalent per mol of 4-cumidine compound.

3. A process for making 1-isopropyl-benzene-4-diazonium fluoride which comprises dissolving 4-cumidine acid sulfate in an excess of liquid, anhydrous hydrogen fluoride, and treating the resulting solution with an alkali metal nitrite in the presence of about 0.5 to 2.0 mols of sulfuric acid equivalent per mol of 4-cumidine acid sulfate.

4. A process for making 1-isopropyl-benzene-4-diazonium fluoride which comprises dissolving a member of the group consisting of 4-cumidine and inorganic acid salts thereof in an excess of liquid, anhydrous hydrogen fluoride, and treating the resulting solution with an alkali metal nitrite in the presence of about 0.5 to 2.0 mols of sulfuric acid per mol of 4-cumidine compound.

5. A process for making 4-fluorocumene which comprises dissolving a member of the group consisting of 4-cumidine and inorganic acid salts thereof in an excess of liquid, anhydrous hydrogen fluoride, treating the resulting solution with an alkali metal nitrite in the presence of at least about 0.5 mol of sulfuric acid equivalent per mol of cumidine compound, thereby producing a reaction mixture containing 1-isopropyl-benzene-4-diazonium fluoride, and then heating said reaction mixture to effect decomposition of the 1-isopropyl-benzene-4-diazonium fluoride.

References Cited in the file of this patent

UNITED STATES PATENTS

| | | |
|---|---|---|
| 1,432,298 | Phillips | Oct. 17, 1922 |
| 2,563,796 | Shenk et al. | Aug. 7, 1951 |

FOREIGN PATENTS

| | | |
|---|---|---|
| 659,897 | Great Britain | Oct. 31, 1951 |